US009747810B2

(12) United States Patent
Peterson

(10) Patent No.: US 9,747,810 B2
(45) Date of Patent: Aug. 29, 2017

(54) MAGNETIC DISPLAY INCLUDING QUICK-RELEASE MECHANISM

(76) Inventor: Gary Peterson, Chicago, IL (US)

( * ) Notice: Subject to any disclaimer, the term of this patent is extended or adjusted under 35 U.S.C. 154(b) by 1060 days.

(21) Appl. No.: 13/807,006

(22) PCT Filed: Feb. 3, 2012

(86) PCT No.: PCT/US2012/023892
§ 371 (c)(1),
(2), (4) Date: Sep. 10, 2013

(87) PCT Pub. No.: WO2012/106688
PCT Pub. Date: Aug. 9, 2012

(65) Prior Publication Data
US 2013/0344472 A1 Dec. 26, 2013

Related U.S. Application Data

(60) Provisional application No. 61/439,817, filed on Feb. 4, 2011.

(51) Int. Cl.
| | | |
|---|---|---|
| G09B 1/08 | (2006.01) | |
| B43L 5/02 | (2006.01) | |
| B43L 1/04 | (2006.01) | |
| G09B 1/38 | (2006.01) | |
| B43L 5/00 | (2006.01) | |
| B43L 1/00 | (2006.01) | |

(52) U.S. Cl.
CPC .............. *G09B 1/08* (2013.01); *B43L 1/008* (2013.01); *B43L 1/045* (2013.01); *B43L 5/005* (2013.01); *B43L 5/022* (2013.01); *G09B 1/38* (2013.01)

(58) Field of Classification Search
USPC ............................................ 434/408; 40/600
See application file for complete search history.

(56) References Cited

U.S. PATENT DOCUMENTS

| | | | | | |
|---|---|---|---|---|---|
| 2,880,452 | A | * | 4/1959 | Forgach | ................. E05D 3/022 16/277 |
| 5,457,905 | A | * | 10/1995 | Kaplan | ............... G09F 15/0012 40/574 |
| 5,941,713 | A | * | 8/1999 | Wayner | .................. A47B 97/04 248/441.1 |
| 6,298,591 | B1 | * | 10/2001 | Healy | ....................... G09F 7/04 248/467 |
| 7,530,526 | B1 | * | 5/2009 | Powers | .................. A47K 10/38 242/422.5 |
| 2006/0073466 | A1 | * | 4/2006 | Solomon | ................... B43L 1/12 434/408 |

* cited by examiner

*Primary Examiner* — James Hull
(74) *Attorney, Agent, or Firm* — Richards Patent Law P.C.

(57) ABSTRACT

A magnetic display unit includes: a display layer; a magnetic layer located behind the display layer; and a quick-release mechanism including an activator, wherein the quick-release mechanism is adapted to increase the distance between the magnetic layer and the display layer such that, when activated by the activator, the quick-release mechanism causes any magnets located along the display layer to be released from the display layer.

12 Claims, 13 Drawing Sheets

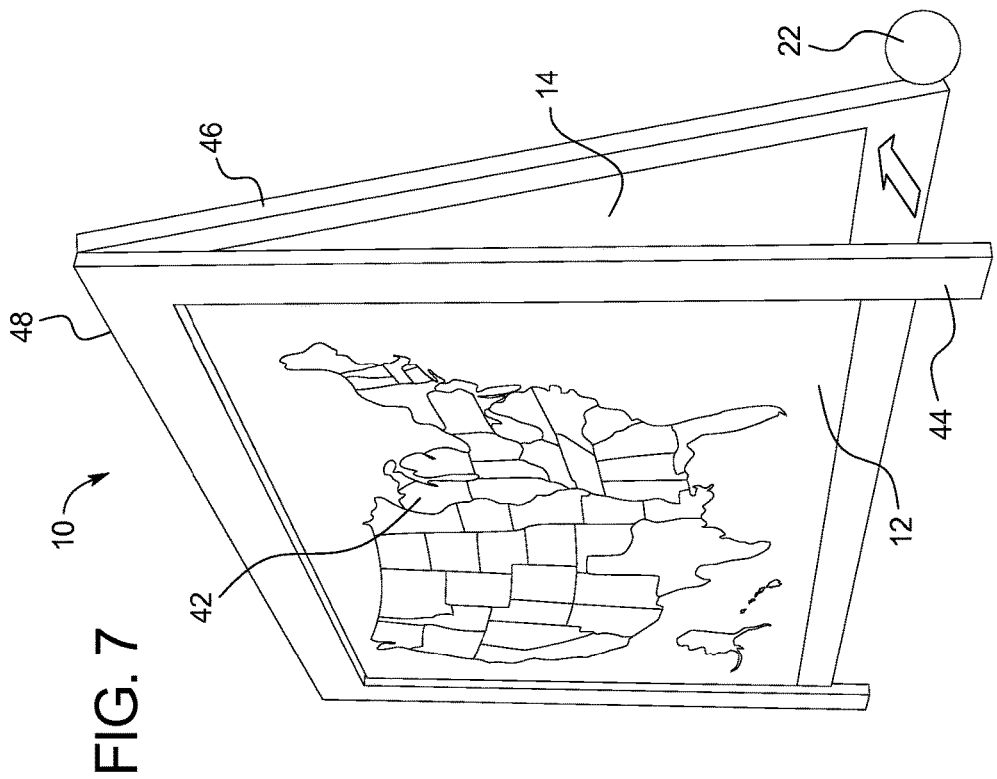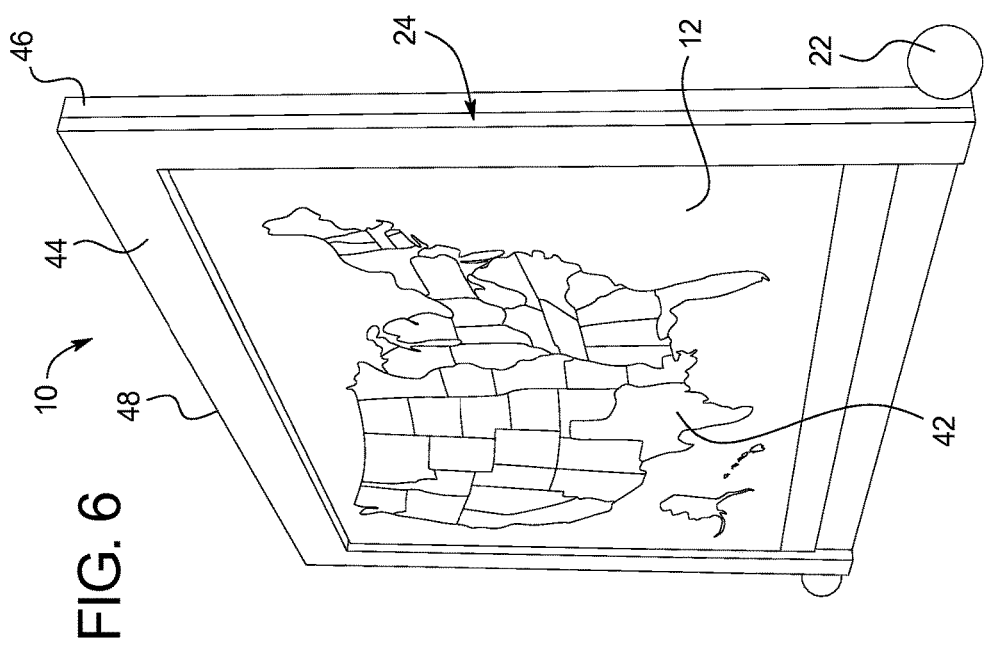

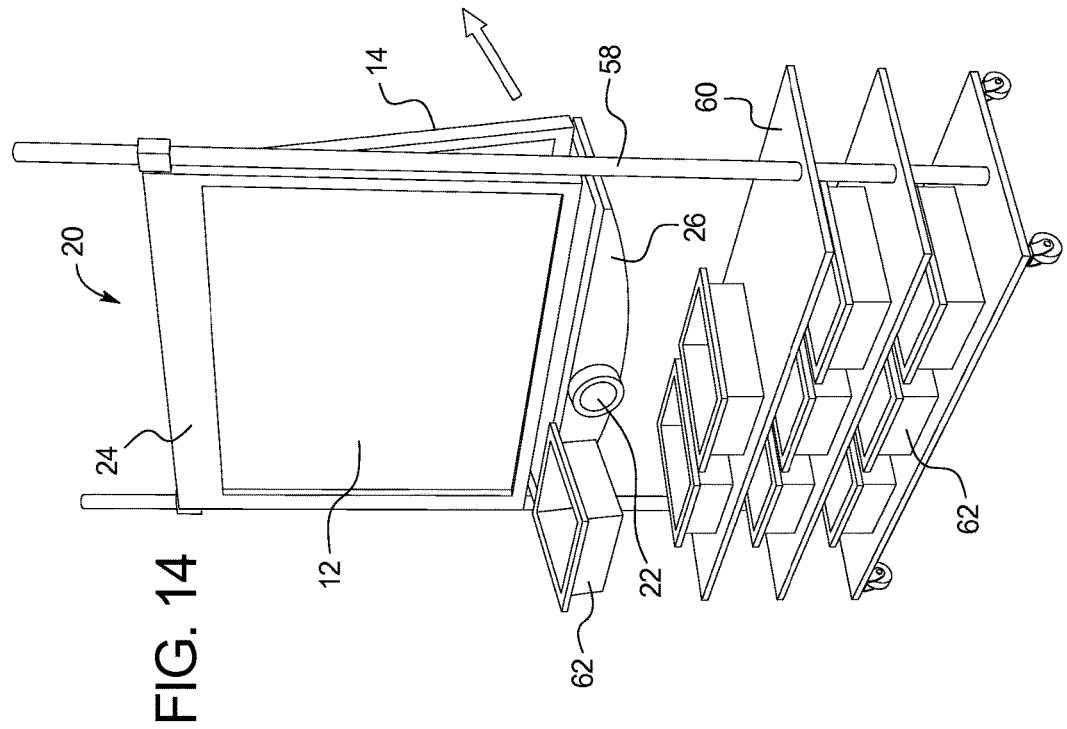
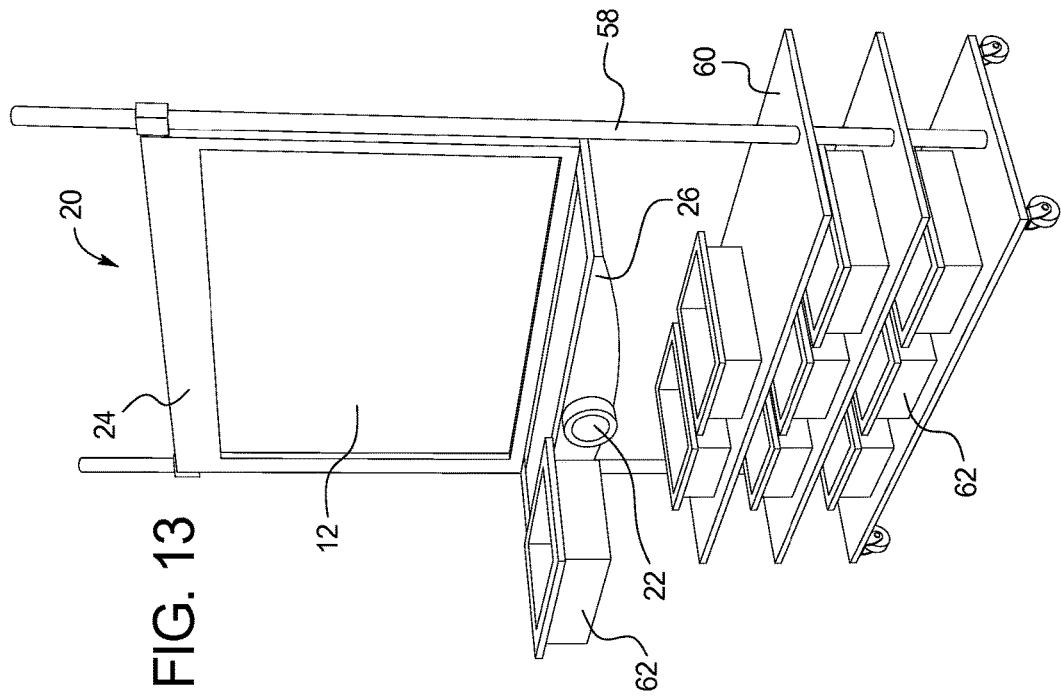

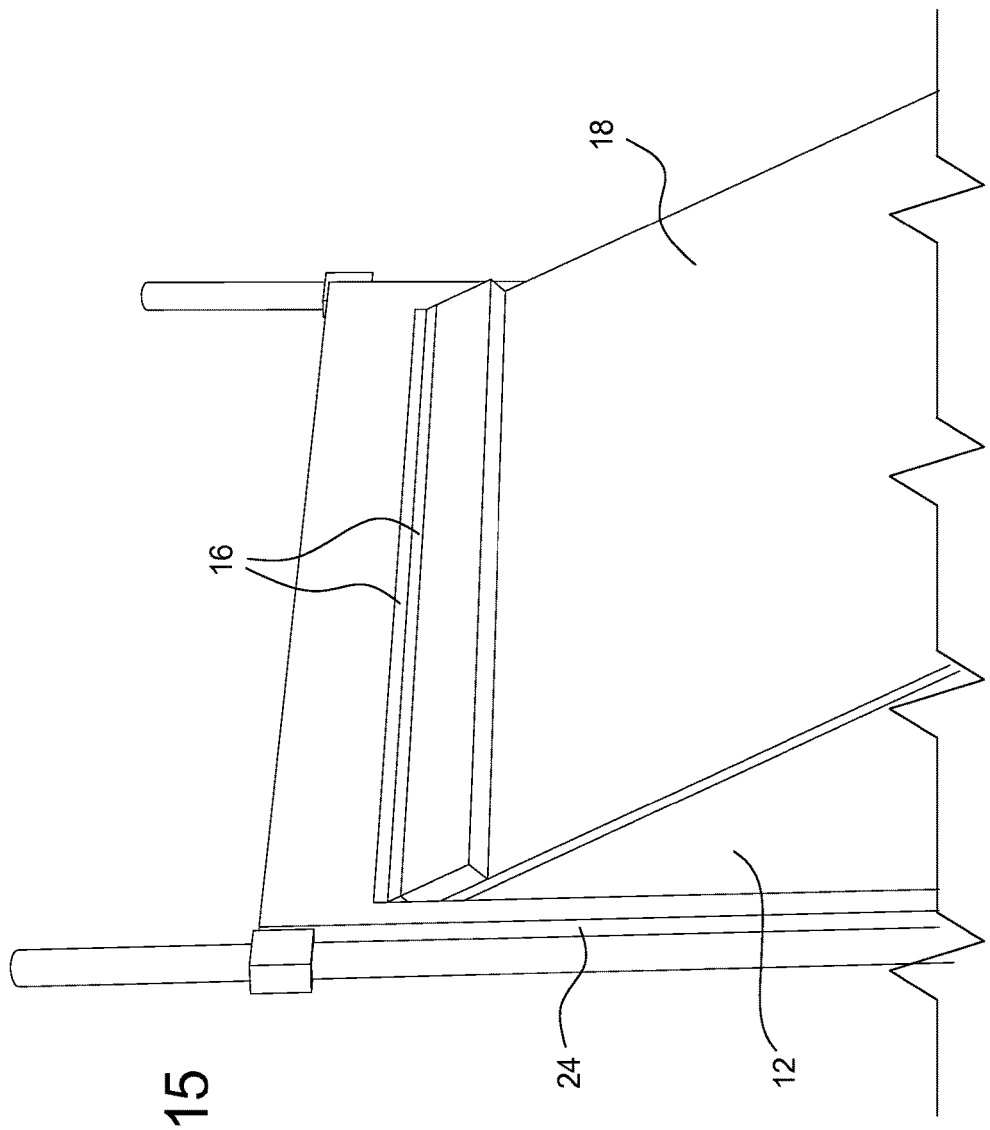

MAGNETIC DISPLAY INCLUDING QUICK-RELEASE MECHANISM

CROSS-REFERENCE TO RELATED APPLICATIONS

This application incorporates by reference and claims priority to U.S. Provisional Patent Application No. 61/439,817 filed Feb. 4, 2011.

BACKGROUND OF THE INVENTION

The present subject matter relates generally to a display unit. More specifically, the present invention relates to a magnetic display unit with a quick-release mechanism.

Magnetic display units may be used for a number or purposes. Creatively, display units can be used for temporary artistic creations. Educationally, display units may provide a structure upon which problem-solving tasks may be completed. Recreationally, display units may be the surface upon which one plays tic-tac-toe or similar games. Magnetic boards may serve as the background for learning and play for children and adults. In its most common use, magnetic items are placed and removed from a magnetic board fairly regularly. However, the magnetic attraction between the board and the items placed thereon often makes it difficult to quickly and efficiently remove items from the board. In most instances, magnetic items need to be removed from the magnetic board individually. Depending on the number of magnetic items connected to the board, their removal may be a very tedious and time-consuming process.

Magnetic display units may include a non-magnetic face. For example, a magnetic display unit may include a whiteboard facing with a magnetic backing. The inclusion of the whiteboard face may improve the function of the display unit, but it does not address the need for a quick and efficient release mechanism for the magnetic objects applied to the face of the display unit.

Accordingly, there is a need for a magnetic display unit including a quick-release mechanism.

BRIEF SUMMARY OF THE INVENTION

In order to meet the needs expressed above, the present subject matter discloses a display unit embodied in a magnetic whiteboard including a quick-release mechanism. The examples disclosed herein provide various embodiments including freestanding display units, wall-mountable display units and others.

In one example, the display unit includes three layers. The first layer is dry erase laminate, which provides a surface for marking and attaching additional removable layers (e.g., a paperboard or laminated sheet that provides expanded functionality). The middle layer is a magnetic layer, which may be thin or perforated in some embodiments to reduce the weight of the display unit. The third layer is a solid backing that provides additional structural support for the display unit and may be affixed to a support surface or other structure. The display unit may include multiple panels and the dry erase laminate surface may be seamless and flexible for folding up the display unit while not in use.

The display unit may include a header that serves as a fixture to fasten to a wall or surface and secure paperboard to the front of the display unit. Accordingly, the header may attach to the top of the display unit. Alternatively, the display unit may include a frame or similar facing to assist in securing a paperboard or similar material to the face of the display unit.

Since the display unit provides a magnetic surface, it is common for a user to place one or more magnets on the display unit, directly onto the whiteboard surface or over a paperboard or other thin surface secured to the whiteboard surface. For example, a user may place magnets of different states on a poster map of the United States of America. Accordingly, the display unit includes a quick-release mechanism for separating magnets from the display unit. The purpose of the quick-release mechanism is to provide a means to quickly remove magnets from the display unit after use, instead of having to remove each magnet individually.

As provided herein, the quick-release mechanism functions by increasing the physical distance between the magnets and the magnetic element in the display unit, which weakens the strength of the magnetic attraction. When the distance between the magnetic element and the magnets is sufficient to break the bond, the magnets are released from the display unit. This feature is of particular benefit when a user has a task of removing numerous magnets at given time. For instance, if the user created a combination of sentences using 100 individual magnetic words they would need to manually remove 100 magnetic elements, whereas all elements, in this case words, may be removed at once via the quick-release mechanism provided herein.

One example of a quick-release mechanism includes an elongated bar that spans the width of the display unit. The elongated bar may be slid between the magnetic layer and the whiteboard layer and/or paperboard so as to increase the distance between the magnetic layer and the magnets sufficient to release any magnets attached to the display unit. For example, the elongated bar of the quick-release mechanism may be located behind a poster or element being displayed, but in front of the whiteboard surface. In another example, the elongated bar may be provided between the whiteboard surface and the magnetic surface, where the movement of the bar may cause separation between the two surfaces sufficient to break the magnetic bonds of any magnet attached to the face of the display unit.

Another example of the quick-release mechanism may be provided in a hinged mechanism through which the magnetic elements of the display unit may be rotated away from the outer surface of the display unit to increase the distance between the magnets and the magnetic element to release the magnets therefrom. Various embodiments of this structure are provided in further detail in the detailed description provided herein.

One example of a magnetic display unit includes: a display layer; a magnetic layer located behind the display layer; and a quick-release mechanism including an activator, wherein the quick-release mechanism is adapted to increase the distance between the magnetic layer and the display layer such that, when activated by the activator, the quick-release mechanism causes any magnets located along the display layer to be released from the display layer. In some embodiments, the display layer includes a whiteboard surface. The magnetic display unit may further include an attachment mechanism adapted to removably secure an additional layer in front of the display layer. The attachment mechanism may include a clamp, a magnetic frame, or other mechanism adapted to removably secure the additional layer. The magnetic display unit may further include a tray positioned substantially beneath the display layer such that, when the magnetic display unit is positioned approximately upright, any magnets released from the magnetic display unit will fall towards the tray.

In certain embodiments, the quick-release mechanism may include a moveable separator element, such as a slidable elongated bar. In other embodiments, the quick-release mechanism may include a hinge enabling the display layer and magnetic layer to be rotated apart from each other. Further, the quick-release mechanism may be spring-loaded.

The activator may be manually activated, such as a manually activated button or handle. Alternatively, the activator may be automatically activated.

In yet another embodiment, a magnetic display unit includes: a display layer including a whiteboard surface; a magnetic layer located behind the display layer; a tray attached to the magnetic layer and positioned substantially beneath and extending in front of the display layer; and a quick-release mechanism, including an activator located on the tray, wherein the quick-release mechanism is adapted to increase the distance between the magnetic layer and the display layer such that, when activated by the activator, the quick-release mechanism causes any magnets located along the display layer to be released from the display layer.

Therefore, an advantage of the display unit is that the quick-release mechanism enables a user to apply magnets and then remove them quickly, thus making the process less tedious, which is helpful in various home, play and educational settings.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6 is a front side perspective view of another display unit including a quick-release mechanism.

FIG. 7 is another front side perspective view of the display unit shown in FIG. 6 with the quick-release mechanism activated.

FIG. 13 is a perspective view of another display unit including a quick-release mechanism.

FIG. 14 is another perspective view of the display unit shown in FIG. 13, wherein the quick-release mechanism has been activated.

FIG. 15 is a perspective view of another display unit including a quick-release mechanism and a magnetic attachment mechanism.

DETAILED DESCRIPTION OF THE INVENTION

Figure 1:
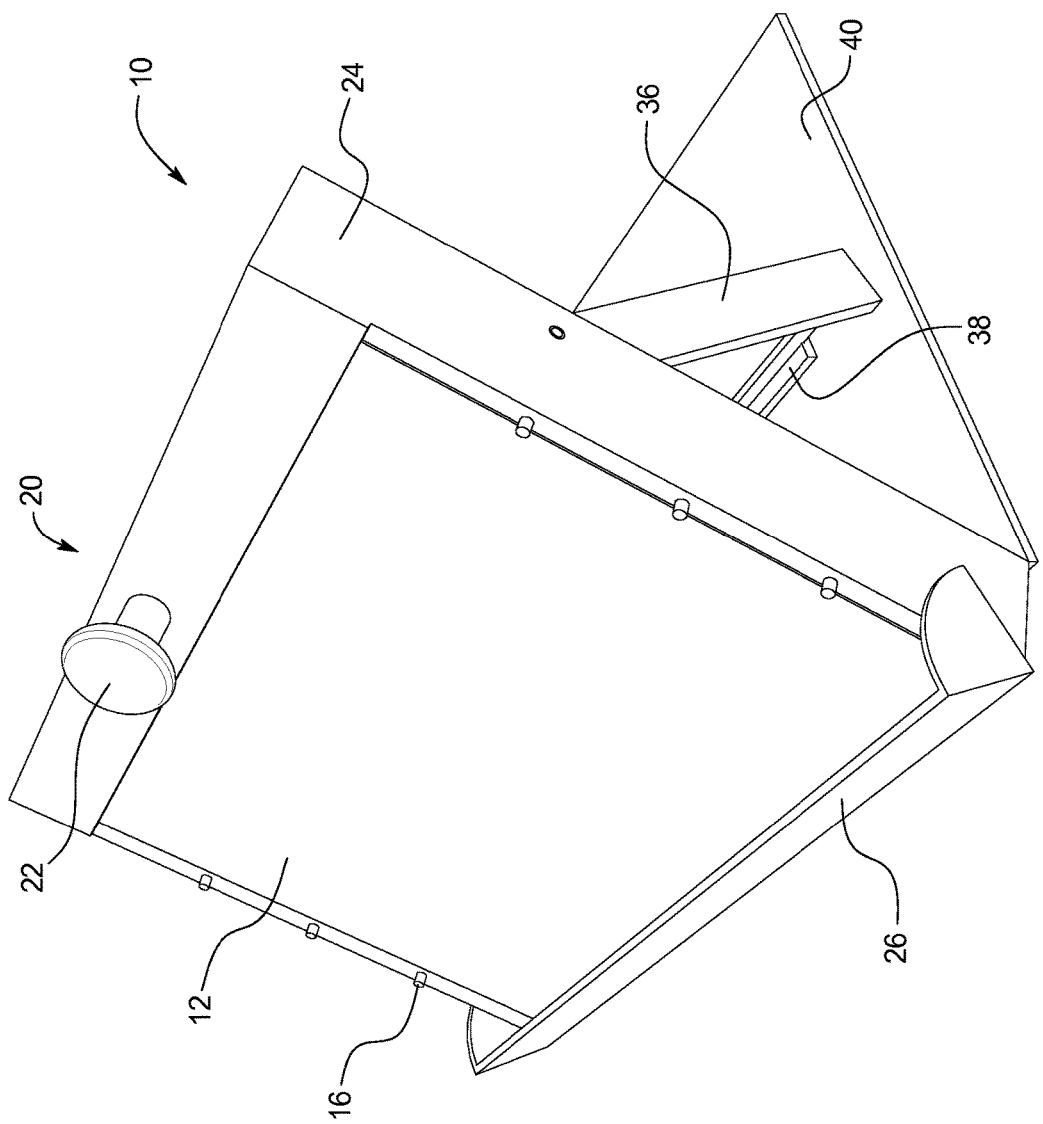
FIG. 1 is a front side perspective view of a display unit including a quick-release mechanism.

FIG. 1 illustrates an example of a display unit 10. As shown in FIG. 1, the display unit 10 includes a display layer 12 overlaying a magnetic layer 14 (shown in FIG. 2). An attachment mechanism 16 is provided that is adapted to removably secure an additional layer 18 (shown in FIG. 3) in front of the display layer 12. A quick-release mechanism 20 including an activator 22 is provided to increase the distance between the magnetic layer 14 and the display layer 12 when activated by the activator 22. As further shown in FIG. 1, this embodiment of the display unit 10 includes a frame 24 and a tray 26.

Figure 2:
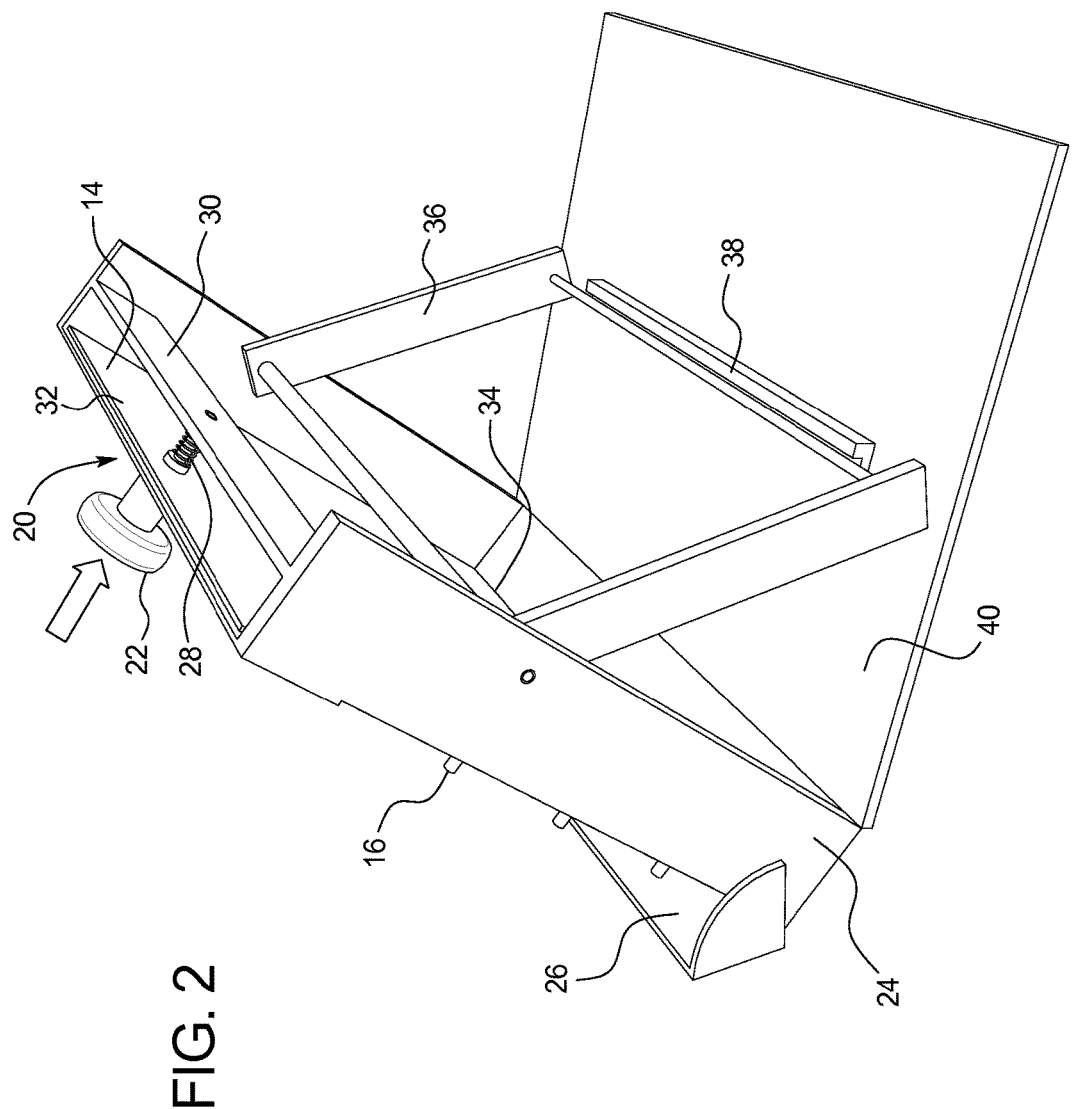
FIG. 2 is rear side perspective view of the display unit shown in FIG. 1.

FIG. 2 illustrates a rear perspective view of the display unit 10 shown in FIG. 1. As shown, the quick-release mechanism 20 further includes a spring 28 braced against a crossbar 30. When a user activates the activator 22 by depressing it into the display unit 10, the top edge 32 of the magnetic layer 14 rotates away from the display layer 12, while the lower edge 34 of the magnetic layer 14 remains in place.

As further shown in FIG. 2, the frame 24 includes folding legs 36 that may be secured against a brace 38 to hold the display unit 10 in an approximately upright position. When not in use, the rear panel 40 may close the folding legs 36 within the frame 24.

As shown in FIG. 2 the magnetic layer 14 is a solid thin layer. However, it is contemplated that the magnetic layer 14 may be formed in other configurations to reduce weight and amount of material. For example, in one contemplated embodiment, the magnetic layer 14 may be perforated to reduce the weight of the display unit 10.

Figure 3:
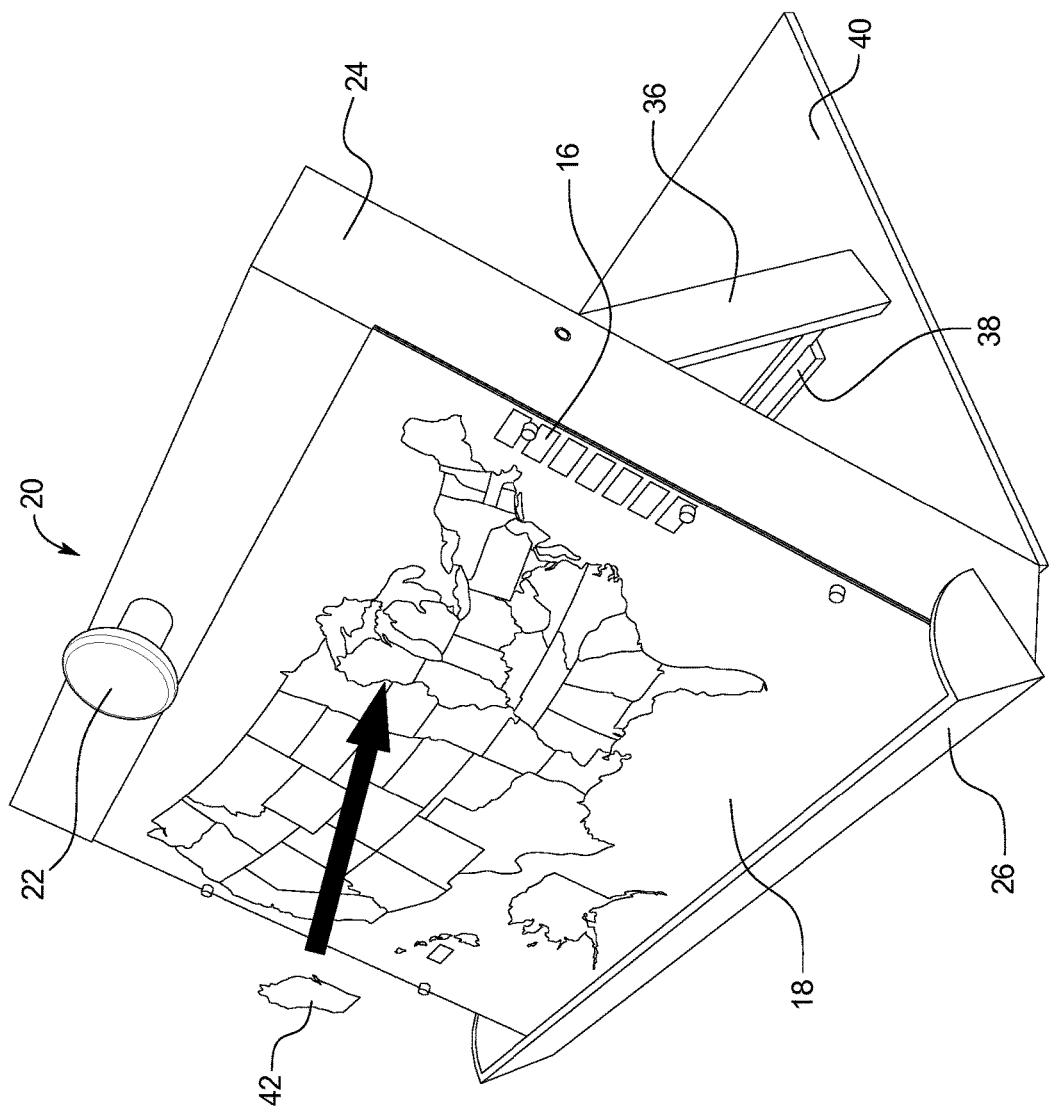
FIG. 3 is another front side perspective view of the display unit shown in FIG. 1 illustrating the placement of a magnet on the display unit.

Turning now to FIG. 3, a paperboard sheet with a printed map of the United States is shown as the additional layer 18. The attachment mechanism 16 shown is a series of alignment pins that are used to assist in placement and attachment of the additional layer 18 along the display layer 12. However, it is contemplated that there are numerous other embodiments of the attachment mechanism 16 that may be employed. For example, a clamp may be provided to hold an additional layer 18 in place on top of the display layer 12. Alternatively, a frame may be provided within which an additional layer 18 may be secured. Further, the map is just one example of an additional layer 18 and nearly limitless variations of additional layers 18 may be used. For example, the additional layer 18 may be a math table configuration for educational purposes or a straight lined paperboard configuration that may be utilized to assist in such educational activities as writing exercises and sentence forming via the utilization of magnet letters and/or words.

In use, one or more magnets 42 may be placed along the additional layer 18. When the user wishes to clean up the magnets 42 from the display unit 10, the user activates the quick-release mechanism 20 by depressing the activator 22 to separate the magnetic layer 14 from the display layer 12 by rotating the top edge 32 of the magnetic layer 14 away from the display layer 12. At that point, the magnetic attraction between the magnetic layer 14 and the magnets 42 is weakened and, when the distance between the magnetic layer 14 and the magnets 42 is sufficient to break the bond, the magnets 42 are released and fall into the tray 26. Accordingly, the quick-release mechanism 20 enables a user to apply and remove magnets 42 quickly, and makes the process less tedious and time consuming, which is helpful in various home, play and educational settings.

In the example shown in FIGS. 1-3, the display unit 10 is generally rectangular in shape, though it is contemplated that the display unit 10 may be any other shape to suit the purpose of the display unit 10. For example, while a rectangular display unit 10 may be particularly suitable for mounting and displaying diagrams, other shapes may be more suitable for alternate uses.

Figure 4:
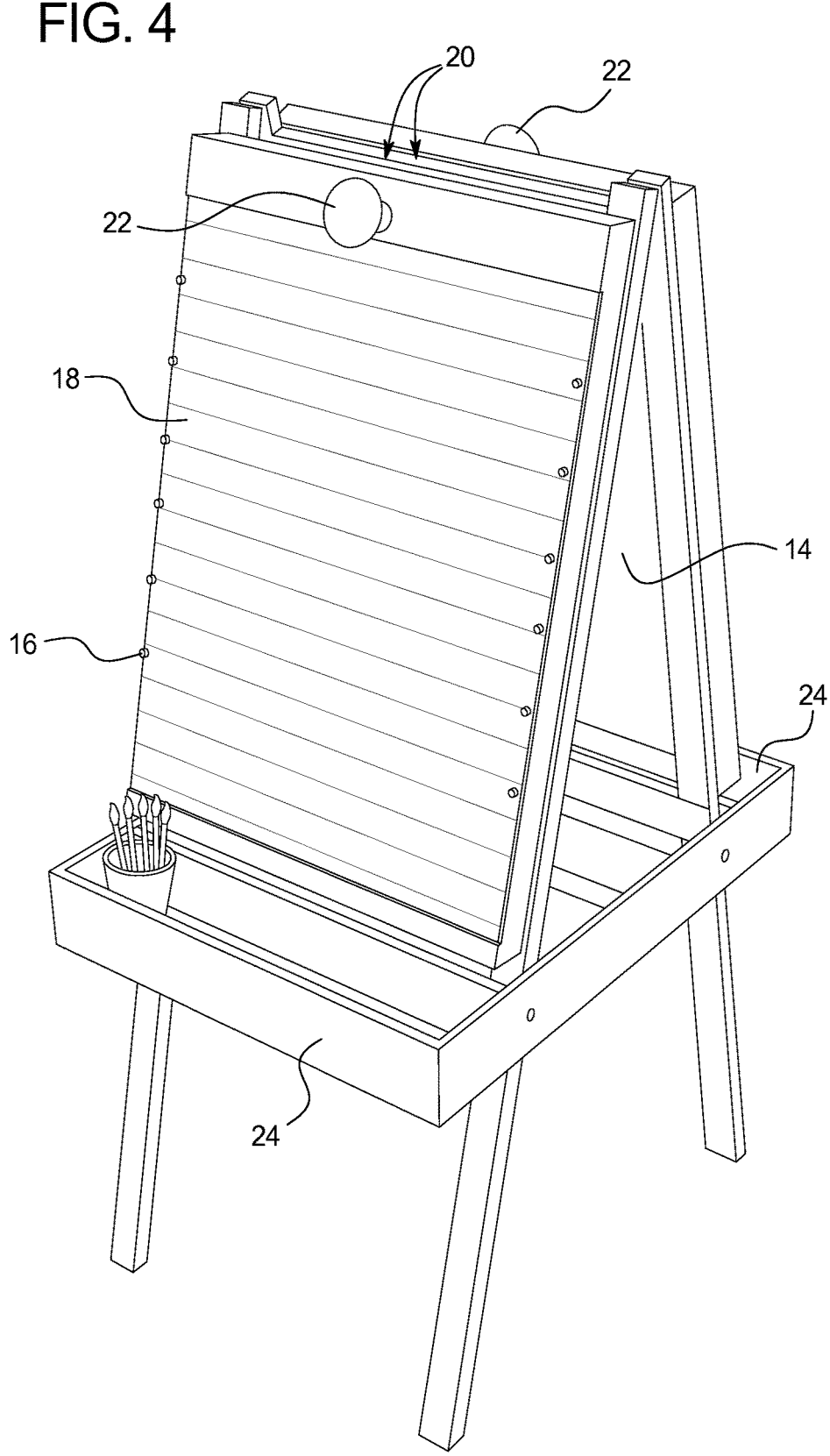
FIG. 4 is a front side perspective view of an easel style structure supporting multiple display units with quick-release mechanisms.

Turning to FIG. 4, an embodiment of the display unit 10 is provided in which there are two sets of display layers 12, magnetic layers 14, attachment mechanisms 16, quick-release mechanisms 20, and trays 26 provided in the form of a unitary, upright easel. FIG. 4 is provided to show that the frame 24 is only one type of housing within which the display unit 10 may be embodied. It will be recognized by those with skill in the art that there are many forms in which the display unit 10 may be embodied based on the disclosures provided herein.

Figure 5:
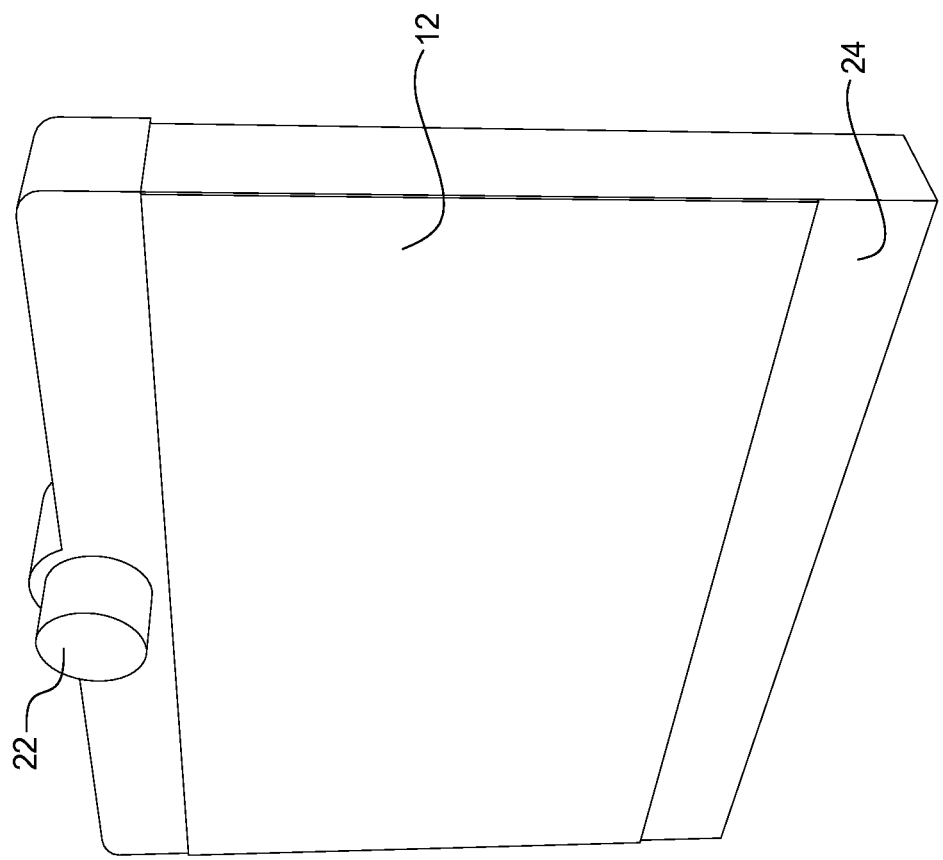
FIG. 5 is a front side perspective view of another display unit including a quick-release mechanism.

FIG. 5 illustrates another example of the display unit 10 embodied in another frame 24. In this embodiment, the display unit 10 is wall mountable or may be adapted to be seated within a stand (not shown).

FIG. 6 provides an example of a display unit 10 including a frame 24 with a front frame 44 and a rear frame 46. The front frame 44 may be attached to a fixed base or stand (not shown) or other stabilizing element. As shown, the front frame 44 and rear frame 46 are pivotally attached along their top edges 48. A display layer 12 is secured within the front frame 44 and a magnetic layer 14 is secured within the rear frame 46. Magnets 42 (shown as magnets 42 in the shape of US states) are shown placed onto the display layer 12. The activator 22 is a handle attached to the rear frame 46.

As shown in FIG. 7, a user may separate the magnetic layer 14 from the display layer 12 by pushing on the activator 22 (i.e., handle). As the user separates the magnetic layer 14 from the display layer 12 by pushing on the activator 22, the magnetic attraction between the magnetic layer 14 and the magnets 42 is weakened and, when the distance between the magnetic layer 14 and the magnets 42 is sufficient to break the bond, the magnets 42 are released.

Figure 8:
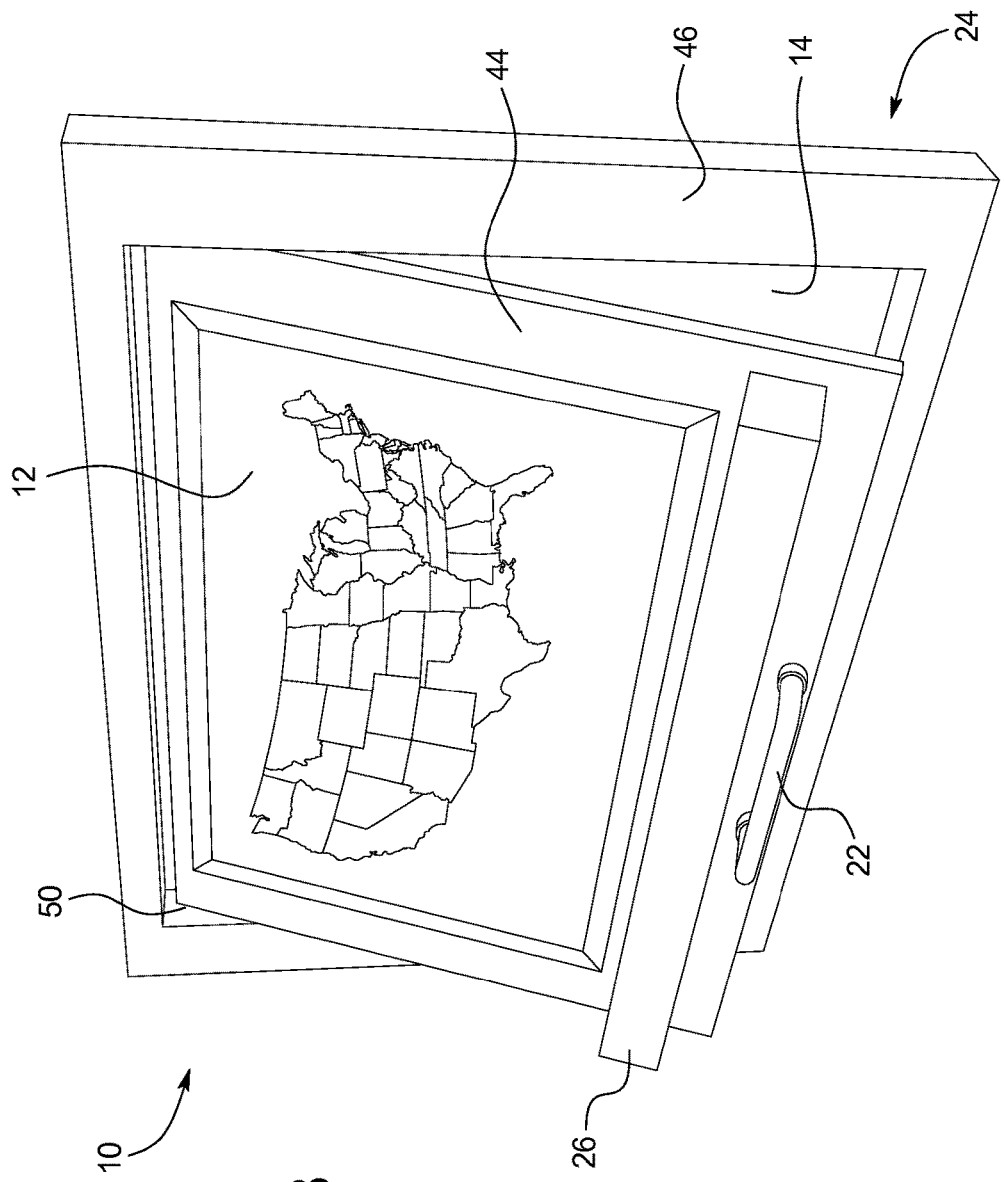
FIG. 8 is a front side perspective view of another display unit including a quick-release mechanism.

FIG. 8 provides another example of a display unit 10. In the example shown in FIG. 8, the display unit 10 is provided in a wall mountable frame 24, again including a front frame 44 and a rear frame 46 pivotally attached along the top side portions at a pivot 50. Like FIGS. 6 and 7, a display layer 12 is secured within a front frame 44 and a magnetic layer 14 is secured within the rear frame 46. In addition, a tray 26 is secured to the front frame 44, below the front surface of the display layer 12. In this embodiment, the activator 22 is a handle. When a user pulls the handle forward, the display layer 12 is separated from the magnetic layer 14. Accordingly, the magnetic attraction between the magnetic layer 14 and the magnets 42 is weakened and, when the distance between the magnetic layer 14 and the magnets 42 is sufficient to break the bond, the magnets 42 are released and fall into the tray 26.

Figure 9:
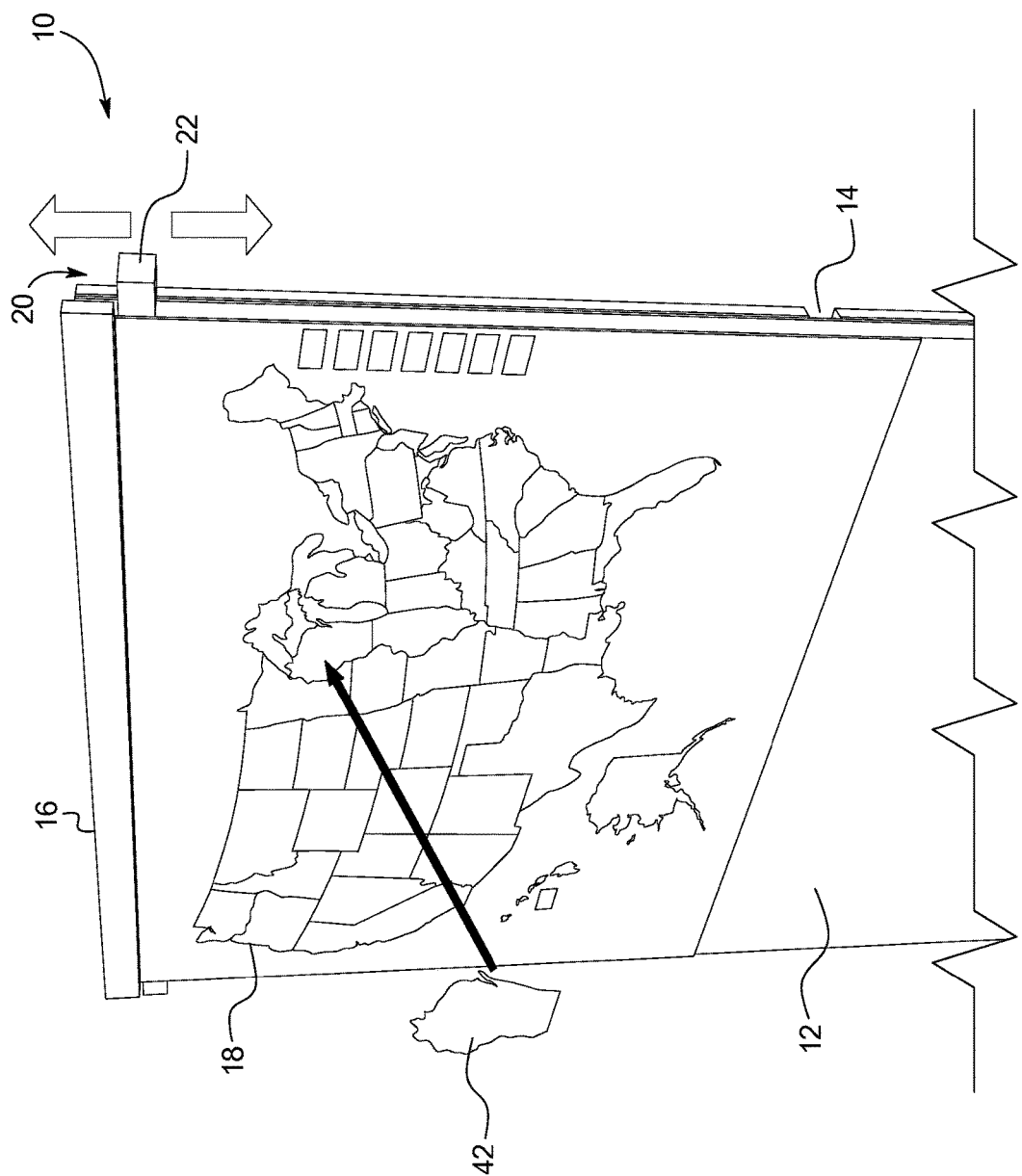
FIG. 9 is a front side perspective view of another display unit including a quick-release mechanism.

FIG. 9 illustrates another example of a display unit 10 incorporating a quick-release mechanism 20. In the example shown in FIG. 9, the display unit 10 is shown with an attachment mechanism 16 in the form of a header. The header serves as a fixture to both fasten the display unit 10 to the wall and securely hold an additional layer 18 on top of the display layer 12. In this example, the additional layer 18 is a map of the US. The activator 20 of the quick-release mechanism 20 attaches to the display unit 10 and is located behind the additional layer 18.

Figure 10:
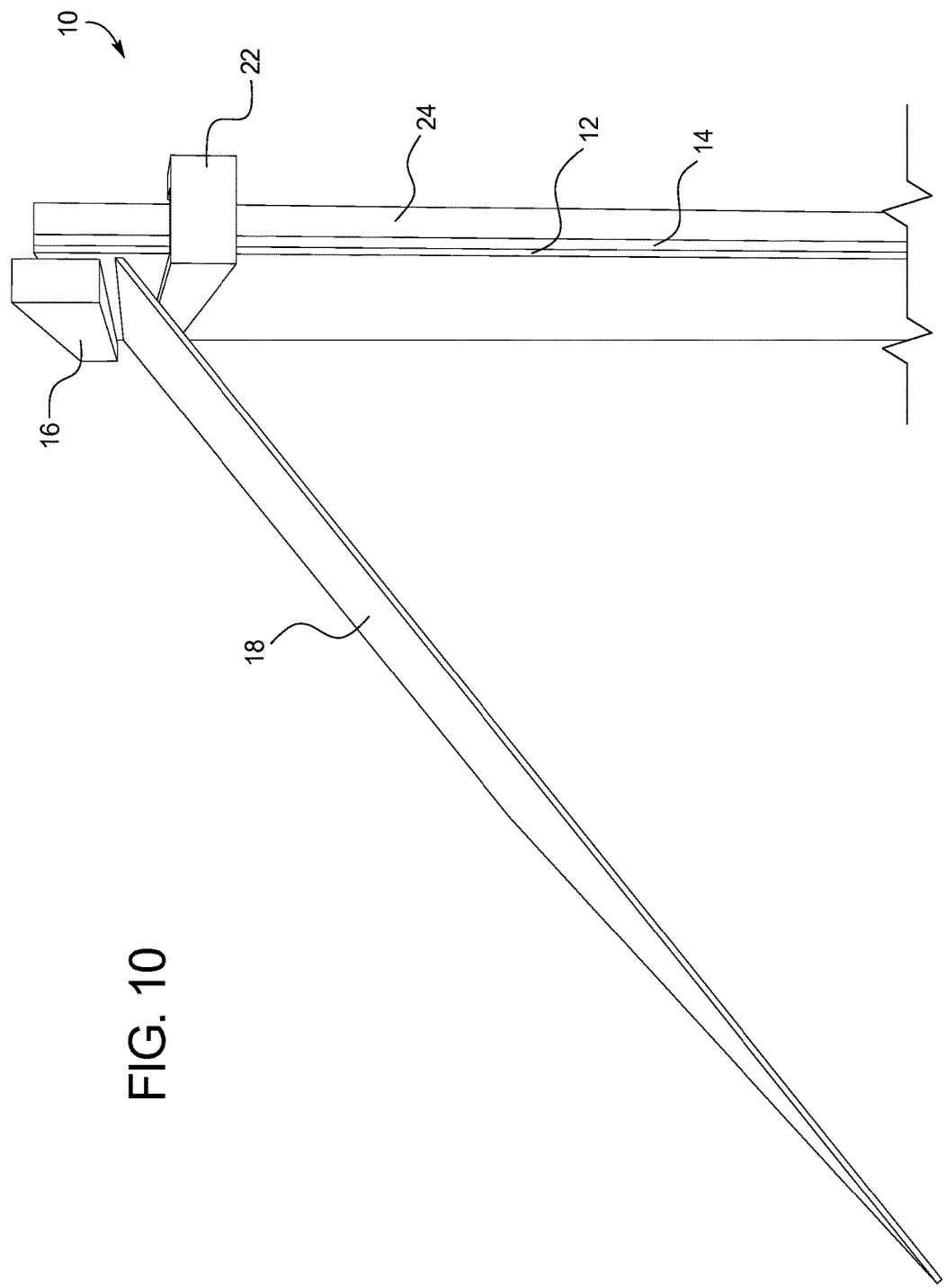
FIG. 10 is a side perspective view of the display unit from FIG. 9.

As shown in FIG. 10, the additional layer 18 is secured to the display layer 12 by the attachment mechanism 16 (i.e., header). The magnetic layer 14 is located behind the display layer 12 and the frame 24 in this example is a foam core backing onto which the other layers are mounted.

The activator 22 is an elongated bar that spans across the face of the display layer 12 beneath the additional layer 18. The activator 22 operates by sliding up and down along the display unit 10. As the activator 22 passes under a portion of the additional layer 18, distance is created between the magnetic layer 14 and any magnets 42 positioned on the additional layer 18. Accordingly, when magnets 42 are placed on the additional layer 18, the quick-release mechanism 20 functions to quickly release those magnets 42 by increasing the physical distance between the magnets 42 and the magnetic layer 14 in the display unit 10, which weakens the strength of the magnetic attraction. When the distance between the magnetic layer 14 and the magnets 42 is sufficient to break the bond, the magnets 42 are released from the display unit 10. Accordingly, the quick-release mechanism enables a user to remove magnets 42 quickly, and makes the process less tedious and time consuming, which is helpful in various home, play and educational settings.

For example, if a series of magnets 42 are placed on the additional layer 18, secured by their attraction to the magnetic layer 14, the activator 22 may be pulled downward encouraging all of the magnets 42 to fall off in a single motion. This quick-release mechanism 20 expedites the process of removing every magnet 42 from the additional layer 18 versus individually removing the magnets.

Figure 11:
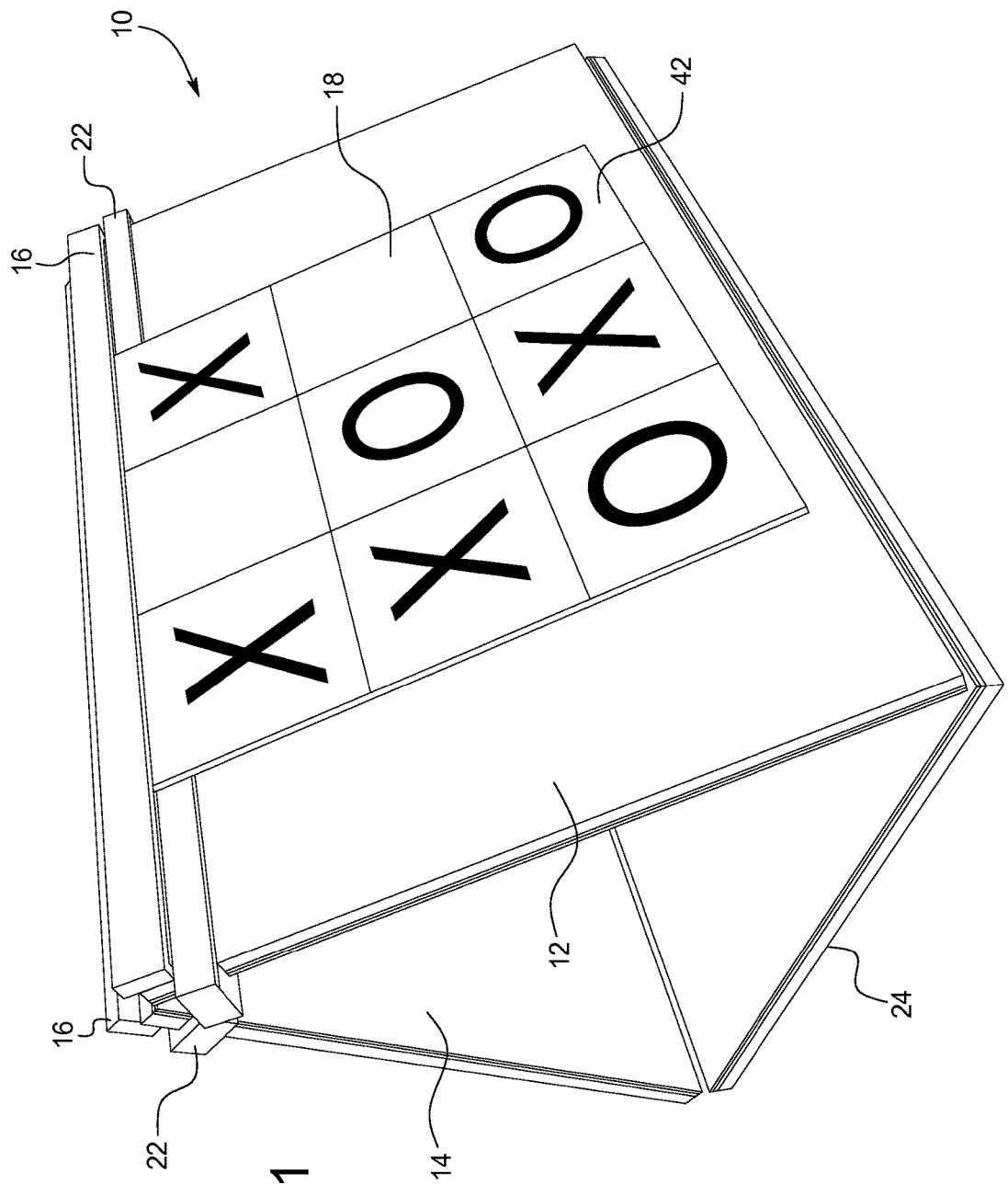
FIG. 11 is a perspective view of another display unit including a pair of quick-release mechanisms.

Turning now to FIG. 11, the illustrated example shows an alternative embodiment in which the display unit 10 is folded into a triangle and includes two sets of display layers 12, magnetic layers 14, attachment mechanisms 16, additional layers 18, and quick-release mechanisms 20, including a pair of activators 22. The triangular form is provided in part by the frame 24, including a base to which the other elements attach. This embodiment allows for two different workspaces that can be used at the same time. It is contemplated that embodiments in the form of a cube or other geometric shapes may be useful for certain purposes and activities as will be recognized by one with skill in the art based on the disclosures provided herein.

Figure 12:
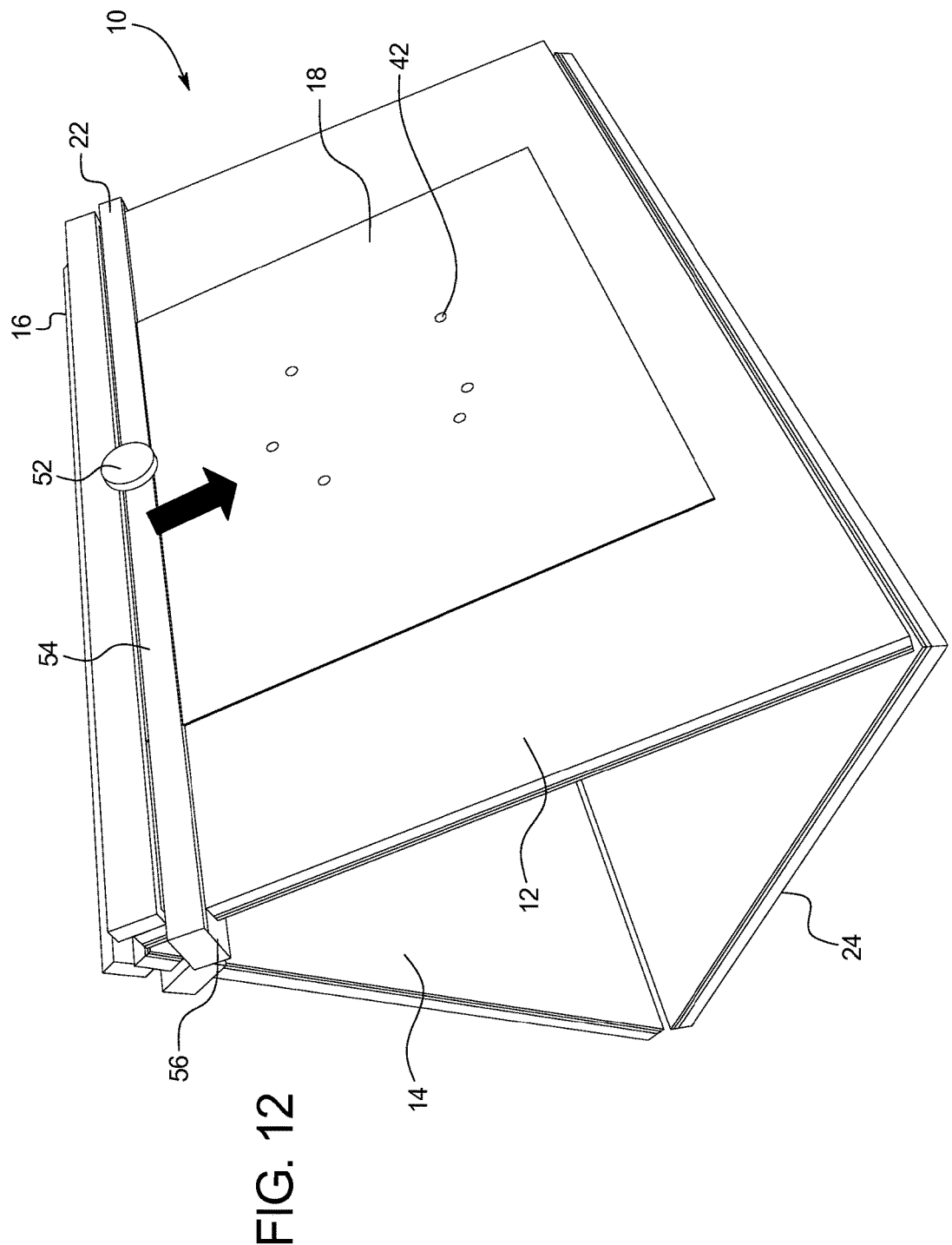
FIG. 12 is a perspective view of another display unit including a pair of quick-release mechanisms.

Similarly, in FIG. 12, the display unit 10 is shown in the same formation as in FIG. 11, however in this embodiment, the quick-release mechanism 20 includes an activator 20 including a knob 52 attached to an outer bar 54, which is connected to an inner bar 56. The outer bar 54 is located above the additional layer 18 at a distance great enough to not interfere with any magnets 42 placed thereon and the inner bar 56 is located behind the additional layer 18 to create a quick-release mechanism 20 similar to that shown in FIG. 11.

While the embodiments described to this point have all utilized manually activated quick-release mechanisms 20, it is contemplated that a display unit 10 may be provided such that the quick-release mechanism 20 is automated. For example, a mechanical quick-release mechanism 20 such as the hinged pivoting movement or sliding bar may be electronically activated in response to a user action, recognized sound, one or more monitored actions detected, etc.

Turning now to FIG. 13, another example of the display unit 10 is shown. As shown in FIG. 13, the display unit 10 includes a stand 58 onto which the display layer 12, magnetic layer 14, and quick-release mechanism 20 are mounted. The quick-release mechanism 20 incorporates a top hinge with an activator 22 positioned towards the bottom of the frame 12. In this embodiment, the tray 26 is integrally formed with the magnetic layer 14 such that they move in unison, as described further below. Further, the activator 22 is incorporated into the tray 26 such as to provide an ergonomically accessible and space-saving configuration in which to initiate the activator 22, which, when activated rotates the quick-release mechanism 20 to create the separation required to release any magnets 42 affixed on the display layer 12, as shown in FIG. 14. As shown, a user activating the activator 22 causes the tray 24 to rotate, pushing the magnetic layer 14 away from the display layer 12, thereby releasing any magnet 42 secured on the display layer 12.

The activator 22 may be electronic, whether in its activation mechanism (i.e., how it activates the quick-release mechanism 20), or in additional functions. For example, the activator 22 may light up when activated. Similarly, the activator 22 may make one or more noises upon activation 22. In yet another example, the activator may include a timer that may be used in coordination with an activity on the display unit 10.

The example of the display unit 10 shown in FIGS. 13 and 14 further includes shelving 60 incorporated into the frame 24. The shelving 60 is shown supporting a group of magnet storage vessels 62, which may be removably affixed to the tray 26 so as to enable convenient access to the magnets 42. As shown, the magnet storage vessels 62 may snap onto and off of the tray 26 as desired or otherwise mate with the tray 26 (e.g., sliding rails, etc.)

FIG. 15 illustrates an example of the display unit 10 in which the attachment mechanism 16 is incorporated into a magnetic frame 24 that surrounds the display layer 12. In this example, the additional layer 18 includes a magnetic header, which is attracted to the magnetic frame 24 to hold the additional layer 18 in place, even when the quick-release mechanism 20 is activated. Of course, in other embodiments, the magnetic header may provide an attraction with the magnetic frame 24 along other edges of the additional layer 18.

In addition to the embodiments shown in FIGS. 1-14, it is contemplated that the magnetic layer 14 may pivot away from the display layer 12 and additional layer 18 (when present) in other manners. For example, the magnetic layer 14 may pivot away from either side of the frame 24, rather than pivoting away from the top or the bottom. Similarly, it is understood that there are numerous mechanisms in which the quick-release mechanism 20 may be embodied. For example, either one or multiple activators 22 (e.g., one each on both sides of the frame 24) may be utilized to move the magnetic layer 14 away from the display layer 12 and additional layer 18 (when present) without the pivoting described in many of the embodiments presented. For example, the quick-release mechanism 20 may cause the magnetic layer 14 to translate laterally away from the display layer 12, rather than pivot or hinge.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A magnetic display unit comprising:
   a display layer;
   a magnetic layer located behind the display layer;
   a frame holding the display layer and magnetic layer, wherein the display layer is securely attached to the frame and the magnetic layer is moveably attached to the frame; and
   a quick-release mechanism including a spring loaded moveable separator comprising a spring braced between the frame and the magnetic layer, such that the spring holds the magnetic layer against the display layer, and an activator connected to the magnetic layer, wherein the quick-release mechanism is adapted to increase the distance between the magnetic layer and the display layer by causing the magnetic layer to move relative to the display layer and frame such that, when the quick-release mechanism is activated by depression of the activator against the spring of the spring loaded moveable separator, the increase in distance between the magnetic layer and the display layer causes any magnets located along the display layer to be released from the display layer by breaking the magnetic bond between the magnets and the magnetic layer.

2. The magnetic display unit of claim 1 wherein the display layer includes a whiteboard surface.

3. The magnetic display unit of claim 1 further including an attachment mechanism adapted to removably secure an additional layer in front of the display layer.

4. The magnetic display unit of claim 1 further including a tray positioned substantially beneath the display layer such that, when the magnetic display unit is positioned approximately upright, any magnets released from the magnetic display unit will fall towards the tray.

5. The magnetic display unit of claim 3 wherein the attachment mechanism is a clamp.

6. The magnetic display unit of claim 3 wherein the attachment mechanism is a magnetic frame.

7. The magnetic display unit of claim 1 wherein the quick-release mechanism includes a hinge enabling the display layer and magnetic layer to be rotated apart from each other.

8. The magnetic display unit of claim 1 wherein the spring loaded moveable separator is manually activated.

9. The magnetic display unit of claim 8 wherein the activator of the spring loaded moveable separator is a button.

10. The magnetic display unit of claim 8 wherein the activator of the spring loaded moveable separator is a handle.

11. The magnetic display unit of claim 1 wherein the spring loaded moveable separator is automatically activated.

12. A magnetic display unit comprising:
   a display layer including a whiteboard surface; a magnetic layer located behind the display layer;
   a tray attached to the magnetic layer and positioned substantially beneath and extending in front of the display layer;
   a frame holding the display layer and magnetic layer, wherein the display layer is securely attached to the frame and the magnetic layer is moveably attached to the frame; and a quick-release mechanism, including a spring loaded moveable separator located on the tray, the moveable separator comprising a spring braced between the frame and the magnetic layer, such that the spring holds the magnetic layer against the display layer, and an activator connected to the magnetic layer, wherein the quick-release mechanism is adapted to increase the distance between the magnetic layer and the display layer by causing the magnetic layer to move relative to the display layer and frame such that, when the quick-release mechanism is activated by depression of the activator against the spring of the spring loaded moveable separator, the distance between the magnetic layer and the display layer causes any magnets located along the display layer to be released from the display layer by breaking the magnetic bond between the magnets and the magnetic layer.

\* \* \* \* \*